United States Patent
Hirai et al.

(10) Patent No.: US 12,162,966 B2
(45) Date of Patent: Dec. 10, 2024

(54) SULFONIC ACID GROUP-CONTAINING POLYMER, FLUOROSULFONYL GROUP-CONTAINING POLYMER, AND LIQUID COMPOSITION

(71) Applicant: AGC Inc., Tokyo (JP)

(72) Inventors: Takeshi Hirai, Tokyo (JP); Hiroyuki Watabe, Tokyo (JP); Susumu Saito, Tokyo (JP)

(73) Assignee: AGC Inc., Tokyo (JP)

( * ) Notice: Subject to any disclaimer, the term of this patent is extended or adjusted under 35 U.S.C. 154(b) by 645 days.

(21) Appl. No.: 17/407,236

(22) Filed: Aug. 20, 2021

(65) Prior Publication Data
US 2021/0380732 A1  Dec. 9, 2021

Related U.S. Application Data

(63) Continuation of application No. PCT/JP2020/008340, filed on Feb. 28, 2020.

(30) Foreign Application Priority Data

Feb. 28, 2019  (JP) .................. 2019-036780

(51) Int. Cl.
*C08F 14/26* (2006.01)
*C08F 8/12* (2006.01)
(Continued)

(52) U.S. Cl.
CPC ................ *C08F 14/26* (2013.01); *C08F 8/12* (2013.01); *H01M 8/1004* (2013.01);
(Continued)

(58) Field of Classification Search
CPC ............. H01M 50/414; H01M 50/449; H01M 8/1004; H01M 8/188; H01M 50/497; C08F 8/12
See application file for complete search history.

(56) References Cited

U.S. PATENT DOCUMENTS

2008/0138685 A1* 6/2008 Kaneko ............... H01M 8/1039
429/492
2015/0030962 A1* 1/2015 Hommura ............ H01B 1/122
521/38

FOREIGN PATENT DOCUMENTS

CN    111051368 A    4/2020
JP    2010018674 A * 1/2010
(Continued)

OTHER PUBLICATIONS

English Machine Translation of JP 2010018674 A (Year: 2010).*
English Machine Translation of WO 2018012374 A1 (Year: 2018).*
(Continued)

*Primary Examiner* — Matthew T Martin
*Assistant Examiner* — Katherine N Higgins
(74) *Attorney, Agent, or Firm* — Element IP, PLC

(57) ABSTRACT

To provide a sulfonic acid group-containing polymer which is capable of forming a low hydrogen permeable membrane, which shows a high ion exchange capacity, and which shows a proper softening temperature. The sulfonic acid group-containing polymer has units u1 represented by the following formula u1, units u2 represented by the following formula u2, and units u3 based on tetrafluoroethylene,

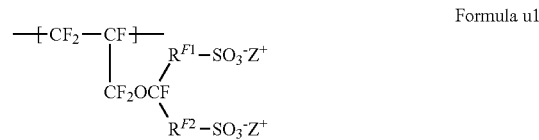

Formula u1 in the formula u1, $R^{F1}$ and $R^{F2}$ are each independently a $C_{1-3}$ perfluoroalkylene group, and $Z^+$ is a hydrogen ion, a metal ion, or an ammonium ion, $$-[CF_2-CF(CF_2O-R^{f1})]-$$   Formula u2

(Continued)

in the formula u2, $R^{f1}$ is a perfluoroalkyl group which may contain a $SO_3^-Z^+$ group and/or an etheric oxygen atom.

15 Claims, 1 Drawing Sheet

(51) Int. Cl.
  *H01M 8/1004* (2016.01)
  *H01M 8/18* (2006.01)
  *H01M 50/414* (2021.01)
  *H01M 50/449* (2021.01)
  *H01M 50/497* (2021.01)

(52) U.S. Cl.
  CPC ......... *H01M 8/188* (2013.01); *H01M 50/414* (2021.01); *H01M 50/449* (2021.01); *H01M 50/497* (2021.01)

(56) References Cited

FOREIGN PATENT DOCUMENTS

| | | |
|---|---|---|
| JP | 5286797 B2 | 9/2013 |
| JP | 5499478 B2 | 5/2014 |
| WO | WO-2018012374 A1 * | 1/2018 ............ C08F 214/18 |

OTHER PUBLICATIONS

English Machine Translation for JP-2010018674-A (Year: 2010).*
International Search Report issued Apr. 7, 2020 in PCT/JP2020/008340, filed on Feb. 28, 2020 citing documents, 2 pages.

* cited by examiner

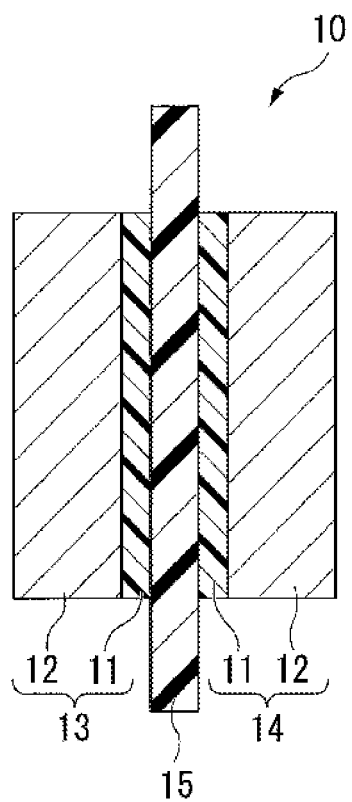

SULFONIC ACID GROUP-CONTAINING POLYMER, FLUOROSULFONYL GROUP-CONTAINING POLYMER, AND LIQUID COMPOSITION

This application is a continuation of PCT Application No. PCT/JP2020/008340, filed on Feb. 28, 2020, which is based upon and claims the benefit of priority from Japanese Patent Application No. 2019-036780 filed on Feb. 28, 2019. The contents of those applications are incorporated herein by reference in their entireties.

TECHNICAL FIELD

The present invention relates to a sulfonic acid group-containing polymer, a fluorosulfonyl group-containing polymer and a liquid composition.

BACKGROUND ART

For a polymer to be contained in a catalyst layer or a polymer electrolyte membrane in a membrane electrode assembly for a polymer electrolyte fuel cell, or in a cation exchange membrane to be used in an chlor-alkali electrolysis, it is desired that the ion exchange capacity is high. When the ion exchange capacity is high, the ion conductivity will be improved, whereby practical benefits can be expected such as improvement of power generation performance of a polymer electrolyte fuel cell and reduction of electric power consumption rate due to reduction of overvoltage such as membrane resistance in chlor-alkali electrolysis.

As a polymer having a high ion exchange capacity, a sulfonic acid group-containing polymer has been proposed, in which fluorosulfonyl groups in a fluorosulfonyl group-containing polymer having units based on a monomer having two fluorosulfonyl groups and units based on tetrafluoroethylene in one molecule, have been converted to sulfonic acid groups (Patent Documents 1 to 2).

PRIOR ART DOCUMENTS

Patent Documents

Patent Document 1: Japanese Patent No. 5286797
Patent Document 2: Japanese Patent No. 5499478

DISCLOSURE OF INVENTION

Technical Problem

On the other hand, in recent years, from the viewpoint of improving the handling efficiency, a polymer having a high ion exchange capacity in which the softening temperature is not too high, is required. A polymer in which the softening temperature is too high, requires a high-temperature for its heat treatment to carry out for stabilization when made into a polymer electrolyte membrane. However, if the softening temperature is too low, there may be a case where the mechanical strength is inferior. Thus, a polymer is required which shows a proper softening temperature of from 120 to 140° C. and which has a high ion exchange capacity. Hereinafter, a case where the softening temperature of a polymer is from 120 to 140° C., will be referred to as a case of showing a proper softening temperature.

Further, in consideration of an application to e.g. a polymer electrolyte membrane, a polymer capable of forming a membrane with low hydrogen permeability is preferred.

The present inventors have evaluated the characteristics of the prior art, whereby it has been impossible to obtain a polymer satisfying the above characteristics.

It is an object of the present invention to provide a sulfonic acid group-containing polymer which is capable of forming a membrane with low hydrogen permeability, which shows a high ion exchange capacity and which shows a proper softening temperature.

Further, it is another object of the present invention to provide a fluorosulfonyl group-containing polymer whereby the sulfonic acid group-containing polymer is obtainable, as well as a liquid composition, a polymer electrolyte membrane, a membrane electrode assembly and a polymer electrolyte fuel cell to be obtained by using the sulfonic acid group-containing polymer.

Solution to Problem

The present invention has the following embodiments.

[1] A sulfonic acid group-containing polymer characterized by having units u1 represented by the following formula u1, units u2 represented by the following formula u2, and units u3 based on tetrafluoroethylene,

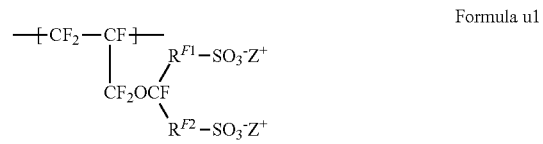

Formula u1 in the formula u1, $R^{F1}$ and $R^{F2}$ are each independently a $C_{1-3}$ perfluoroalkylene group, and $Z^+$ is a hydrogen ion, a metal ion, or an ammonium ion,

Formula u2 in the formula u2, $R^{f1}$ is a perfluoroalkyl group which may contain a $SO_3^-Z^+$ group and/or an etheric oxygen atom.

[2] The sulfonic acid group-containing polymer according to [1], of which the softening temperature is from 120 to 140° C.

[3] The sulfonic acid group-containing polymer according to [1] or [2], of which the hydrogen gas permeation coefficient under the conditions of a temperature of 80° C. and a relative humidity of 10% is at most $2.9 \times 10^{-9}$ cm$^3$·cm/(s·cm$^2$·cmHg).

[4] A fluorosulfonyl group-containing polymer characterized by having units u4 represented by the following formula u4, units u5 represented by the following formula u5, and units u6 based on tetrafluoroethylene,

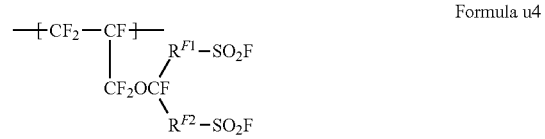

Formula u4 in the formula u4, $R^{F1}$ and $R^{F2}$ are each independently a $C_{1-3}$ perfluoroalkylene group,

Formula u5 in the formula u5, $R^{f2}$ is a perfluoroalkyl group which may contain an $SO_2F$ group and/or an etheric oxygen atom.

[5] The fluorosulfonyl group-containing polymer according to [3], of which the TQ value is at least 220° C.

[6] A method for producing a sulfonic acid group-containing polymer as defined in any one of [1] to [3], which comprises hydrolyzing fluorosulfonyl groups in the fluorosulfonyl group-containing polymer as defined in [4] or [5] to form salt type sulfonic acid groups, and, as the case requires, further converting the salt type sulfonic acid groups to the acid type, to form acid type sulfonic acid groups.

[7] The method for producing a sulfonic acid group-containing polymer according to [6], wherein after the hydrolysis or conversion to the acid type, the sulfonic acid group-containing polymer is permitted to be in contact with an aqueous hydrogen peroxide solution.

[8] A liquid composition comprising a sulfonic acid group-containing polymer as defined in any one of [1] to [3] and a liquid medium.

[9] A polymer electrolyte membrane comprising a sulfonic acid group-containing polymer as defined in any one of [1] to [3].

[10] The polymer electrolyte membrane according to [9], which further contains a reinforcing material.

[11] A membrane electrode assembly comprising an anode having a catalyst layer, a cathode having a catalyst layer, and the polymer electrolyte membrane as defined in [9] or [10] disposed between the anode and the cathode,
wherein at least one selected from the group consisting of the catalyst layer in the anode, the catalyst layer in the cathode and the polymer electrolyte membrane contains the sulfonic acid group-containing polymer as defined in any one of [1] to [3].

[12] A polymer electrolyte fuel cell provided with the membrane electrode assembly as defined in [11].

[13] A cation exchange membrane for an chlor-alkali electrolysis, which comprises a sulfonic acid group-containing polymer as defined in any one of [1] to [3].

[14] An ion exchange membrane for water electrolysis, which comprises a sulfonic acid group-containing polymer as defined in any one of [1] to [3].

[15] A diaphragm for redox flow secondary battery, which comprises a sulfonic acid group-containing polymer as defined in any one of [1] to [3].

[16] An ion exchange membrane for electrochemical hydrogen pump, which comprises a sulfonic acid group-containing polymer as defined in any one of [1] to [3].

[17] An electrochemical cell which comprises a sulfonic acid group-containing polymer as defined in any one of [1] to [3].

Advantageous Effects of Invention

According to the present invention, it is possible to provide a sulfonic acid group-containing polymer which is capable of forming a membrane with low hydrogen permeability, which shows a high ion exchange capacity and which shows a proper softening temperature, and a fluorosulfonyl group-containing polymer whereby said sulfonic acid group-containing polymer can be obtained, as well as a liquid composition, a polymer electrolyte membrane, a membrane electrode assembly and a polymer electrolyte fuel cell, which are obtainable by using said sulfonic acid group-containing polymer.

BRIEF DESCRIPTION OF DRAWING

FIG. 1 is a schematic cross-sectional view showing an example of a membrane electrode assembly of the present invention.

DESCRIPTION OF EMBODIMENTS (Definitions of Terms, etc.)

The following definitions and descriptions of terms apply throughout the specification and claims.

A "sulfonic acid group" is a general term for a salt type sulfonic acid group ($-SO_3^-M^+$, where $M^+$ is a metal ion or an ammonium ion) and an acid type sulfonic acid group ($-SO_3^-H^+$).

A compound represented by the formula 1-1 is shown by a compound 1-1. Compounds represented by other formulas are also shown in the same manner.

A "unit" in a polymer means an atomic group derived from one molecule of a monomer, formed by polymerization of the monomer. A unit may be an atomic group directly formed by the polymerization reaction, or may be an atomic group having a part of the atomic group changed to another structure by treating the polymer obtained by the polymerization reaction.

The "hydrogen gas permeation coefficient" of a polymer is a value obtainable by bringing a membrane made of the polymer to be 80° C., measuring the hydrogen gas permeation amount under 10% humidification by an equal pressure method, and dividing the permeation amount by the thickness of the membrane.

The "ion exchange capacity" of a polymer is obtained by the method described in Examples.

The "TQ value" of a polymer is obtained by the method described in Examples.

(Sulfonic Acid Group-Containing Polymer)

A sulfonic acid group-containing polymer of the present invention (hereinafter referred to also as a "polymer H") has units u1 represented by the following formula u1, units u2 represented by the following formula u2, and units u3 based on tetrafluoroethylene (hereinafter referred to also as "TFE").

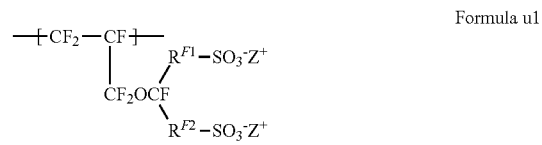

Formula u1

In the formula u1, $R^{F1}$ and $R^{F2}$ are each independently a $C_{1-3}$ perfluoroalkylene group. $R^{F1}$ and $R^{F2}$ may be the same or different.

As $R^{F1}$ and $R^{F2}$, $-CF_2-$, $-CF_2CF_2-$, $-CF(CF_3)-$, $-CF_2CF_2CF_2-$, $-CF(CF_2CF_3)-$, $-CF(CF_3)CF_2-$, $-CF_2CF(CF_3)-$, $-C(CF_3)(CF_3)-$, etc. may be mentioned. From such a viewpoint that raw material is less expensive, and it is also possible to make the ion exchange capacity of the sulfonic acid group-containing polymer higher, $R^{F1}$ and $R^{F2}$ are preferably a $C_{1-2}$ perfluoroalkylene group, and preferably linear. Specifically, $-CF_2-$, $-CF_2CF_2-$, or $CF(CF_3)-$ is preferred, and $-CF_2-$ is particularly preferred.

In the formula u1, $Z^+$ is a hydrogen ion, a metal ion, or an ammonium ion. As the metal ion, an alkali metal is preferred.

Formula u2

In the formula u2, $R^{f1}$ is a perfluoroalkyl group which may contain a $SO_3^-Z^+$ group and/or an etheric oxygen atom.

As $R^{f1}$, $CF_2CF_2SO_3^-Z^+$, $CF_2CF(OCF_2CF_2SO_3^-Z^+)$ $CF_2OCF_2CF_2SO_3^-Z^+$, $CF_2CF(OCF_2CF_2SO_3^-Z^+)$ $CF_2CF_2SO_3^-Z^+$, $CF_2CF_2CF_2OCF(CF_2SO_3^-Z^+)_2$, $CF_3$, $CF_2CF_3$, $CF_2CF_2CF_3$, $CF_2CF(CF_3)OCF_2CF_2CF_3$, $CF_2CF(CF_3)OCF_2CF(CF_3)OCF_2CF_2CF_3$, $CF_2OCF_2CF_2CF_2OCF_3$, etc. may be mentioned.

As $R^{f1}$, in a case where it contains a $SO_3^-Z^+$ group, $CF_2CF_2SO_3^-Z^+$ is preferred from such reasons that it is possible to make the ion exchange capacity of the sulfonic acid group-containing polymer higher and the synthesis of the monomer is easy.

As $R^{f1}$, in a case where it does not contain a $SO_3^-Z^+$ group, $CF_3$, $CF_2CF_3$, $CF_2CF_2CF_3$, or $CF_2CF_2OCF_2CF_2CF_2OCF_3$, is preferred from such a reason that it is possible to adjust the softening temperature of the sulfonic acid group-containing polymer to a proper range by a small amount of units u3.

Polymer H may further have units X other than units u1, units u2 and units u3.

As units X, for example, units based on a monomer such as hexafluoropropylene, chlorotrifluoroethylene, trifluoroethylene, vinylidene fluoride, or vinyl fluoride, may be mentioned. As units X, with a view to enhancing the chemical durability of the sulfonic acid group-containing polymer, units based on a perfluoromonomer such as hexafluoropropylene, are preferred.

<Physical Properties>

The ion exchange capacity of polymer H is preferably from 1.1 to 2.5 meq/g dry resin, more preferably from 1.4 to 2.4 meq/g dry resin, particularly preferably from 1.7 to 2.3 meq/g dry resin. When the ion exchange capacity is at least the lower limit value in the above range, the ion conductivity of polymer H becomes high, whereby when used in the polymer electrolyte membrane or the catalyst layer in a polymer electrolyte fuel cell, it is possible to obtain a sufficient cell output. Further, when it is used for an ion exchange membrane for chlor-alkali electrolysis or water electrolysis, overvoltage such as the membrane resistance decreases. When the ion exchange capacity is at most the upper limit value in the above range, swelling can be suppressed at the time when polymer H has absorbed water, and the mechanical strength will be high at the time when made into a polymer electrolyte membrane. Or, when used in the catalyst layer, flooding of the polymer electrolyte fuel cell can be suppressed.

The softening temperature of polymer H is preferably from 120 to 140° C., more preferably from 122 to 138° C., particularly preferably from 125 to 135° C. When the softening temperature is at least the lower limit value in the above range, when made into a polymer electrolyte membrane, the mechanical strength at a high temperature becomes high. When the softening temperature is at most the upper limit value in the above range, it is possible to lower the temperature for annealing treatment of the polymer electrolyte membrane, or for hot pressing required for the transfer of the catalyst layer or for the formation of a membrane electrode assembly.

The "softening temperature" of polymer H is obtained in the same manner as in the measurement method for the softening temperature in Examples described later, except that the object to be measured is changed to a membrane (thickness 50 μm) made of polymer H.

The hydrogen gas permeation coefficient of polymer H under the conditions of a temperature of 80° C. and a relative humidity of 10% is, from such a viewpoint that polymer H will be excellent in hydrogen gas barrier properties, preferably at most $2.9\times10^{-9}$ cm$^3$·cm/(s·cm$^2$·cmHg), more preferably at most $2.7\times10^{-9}$ cm$^3$·cm/(s·cm$^2$·cmHg), further preferably at most $2.5\times10^{-9}$ cm$^3$·cm/(s·cm$^2$·cmHg).

The hydrogen gas permeation coefficient of polymer H under the conditions of a temperature of 80° C. and a relative humidity of 10% is, from the viewpoint of maintaining the conductivity of polymer H to be high, preferably at least $1.0\times10^{-12}$, particularly preferably at least $1.0\times10^{-11}$.

<Method for Producing Polymer H>

As one example of the method for producing polymer H, a method of converting fluorosulfonyl groups in a fluorosulfonyl group-containing polymer of the present invention to be described later to sulfonic acid groups may be mentioned.

As the method of converting the fluorosulfonyl groups to sulfonic acid groups, a method may be mentioned in which fluorosulfonyl groups in a polymer F are hydrolyzed to salt type sulfonic acid groups, and, as the case requires, the salt type sulfonic acid groups are further converted to acid type sulfonic acid groups. The temperature for the hydrolysis or conversion to an acid type, is preferably from 0 to 120° C. Further, after the hydrolysis or conversion to an acid type, it is preferred to wash the polymer with water.

Further, after the above hydrolysis or the above conversion to an acid type, the sulfonic acid group-containing polymer may be brought in contact with an aqueous hydrogen peroxide solution. By the contact treatment, it is possible to decompose and remove organic substances contained as impurities in the polymer.

The concentration of hydrogen peroxide in the aqueous hydrogen peroxide solution is preferably from 0.1 to 30 mass %, more preferably at least 1 mass % and less than 10 mass %. When the concentration of hydrogen peroxide in the aqueous hydrogen peroxide solution is at least the lower limit value in the above range, the effect of decomposing organic substances will be sufficient. When the concentration of hydrogen peroxide in the aqueous hydrogen peroxide solution is at most the upper limit value in the above range, polymer H is less likely to be decomposed.

The temperature of the aqueous hydrogen peroxide solution is preferably from 15 to 90° C., more preferably at least 40° C. and lower than 80° C. When the temperature of the aqueous hydrogen peroxide solution is at least the lower limit value in the above range, the effect of decomposing organic substances will be sufficient. When the temperature of the aqueous hydrogen peroxide solution is at most the upper limit value in the above range, hydrogen peroxide is less likely to be decomposed.

(Fluorosulfonyl Group-Containing Polymer)

A fluorosulfonyl group-containing polymer of the present invention (hereinafter referred to also as a "polymer F") has units u4 represented by the following formula u4, units u5 represented by the following formula u5, and units u6 based on tetrafluoroethylene (TFE).

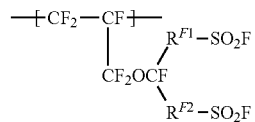

Formula u4

In the formula u4, $R^{F1}$ and $R^{F2}$ are the same as $R^{f1}$ and $R^{f2}$ described in the formula u1, and the preferred embodiments are also the same.

$$—[CF_2—CF(CF_2O—R^{f2})]—\qquad \text{Formula u5}$$

In the formula u5, $R^{f2}$ is a perfluoroalkyl group which may contain a $SO_2F$ group and/or an etheric oxygen atom, and, except that the $SO_3^-Z^+$ group is substituted by a $SO_2F$ group, it is the same as $R^{f1}$ described in the formula u2, and the preferred embodiments are also the same.

As $R^{f2}$, $CF_2CF_2SO_2F$, $CF_2CF(OCF_2CF_2SO_2F)$ $CF_2OCF_2CF_2SO_2F$, $CF_2CF(OCF_2CF_2SO_2F)CF_2CF_2SO_2F$, $CF_2CF_2CF_2OCF(CF_2SO_2F)_2$, $CF_3$, $CF_2CF_3$, $CF_2CF_2CF_3$, $CF_2CF(CF_3)OCF_2CF_2CF_3$, $CF_2CF(CF_3)OCF_2CF(CF_3)$ $OCF_2CF_2CF_3$, $CF_2CF_2OCF_2CF_2CF_2OCF_3$, etc. may be mentioned.

Here, a monomer corresponding to a unit wherein $R^{f2}$ represented by $CF_2CF_2CF_2OCF(CF_2SO_2F)_2$ can be synthesized by the synthesis route shown by the following formula. Monomers corresponding to other examples can be synthesized by known methods.

As specific examples of the liquid medium, water and an organic solvent may be mentioned. As the liquid medium, only water may be used, only an organic solvent may be used, or a mixed solvent of water and an organic solvent may be used, but it is preferred to use a mixed solvent of water and an organic solvent.

In a case where water is contained as the liquid medium, the dispersibility or solubility of polymer H to the liquid medium will easily be improved. In a case where an organic solvent is contained as the liquid medium, an electrolyte membrane which is hardly breakable will easily be obtainable.

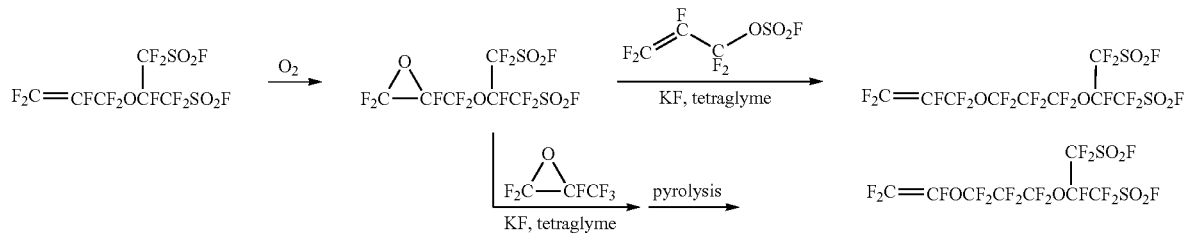

As $R^{f2}$, when it contains a $SO_2F$ group, $CF_2CF_2SO_2F$ is preferred from such reasons that the ion exchange capacity of the sulfonic acid group-containing polymer can be made higher and the synthesis of the monomer is easy.

As $R^{f2}$, when it does not contain a $SO_2F$ group, $CF_3$, $CF_2CF_3$, $CF_2CF_2CF_3$ or $CF_2CF_2OCF_2CF_2CF_2OCF_3$ is preferred from such reasons that the softening temperature of the sulfonic acid group-containing polymer can be adjusted to a proper range by a small amount of units u3.

The polymer F may further have units X other than units u4, units u5 and units u6. Units X are the same as units X described for polymer F.

The TQ value of polymer F is preferably at least 220° C., more preferably from 225 to 550° C., further preferably from 230 to 530° C. When the TQ value is at least the lower limit value, it is possible to obtain a polymer H having a sufficient molecular weight, whereby the mechanical strength of the electrolyte membrane will be more excellent. When the TQ value is at most the upper limit value, the solubility or dispersibility of polymer H to the liquid medium will be improved, whereby it will be easy to prepare a liquid composition. The TQ value is an index for the molecular weight of polymer F.

<Application>

The application of polymer H is not particularly limited, but from such a viewpoint that the ion exchange capacity is high, it is preferably used as an electrolyte for a polymer electrolyte membrane.

(Liquid Composition)

The liquid composition of the present invention comprises a polymer H and a liquid medium. The liquid composition may be one having polymer H dispersed in the liquid medium, or may be one having polymer H dissolved in the liquid medium.

Since the liquid composition of the present invention contains polymer H, an electrolyte membrane obtainable by using the liquid composition of the present invention, will be excellent in conductivity and mechanical strength in a high temperature environment.

As the organic solvent, from such a viewpoint that a hardly breakable catalyst layer will easily be formed, at least one type of $C_{1-4}$ alcohols is preferred.

As the $C_{1-4}$ alcohols, for example, methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol, and 3,3,3-trifluoro-1-propanol may be mentioned.

As the organic solvent, one type may be used alone, or two or more types may be used in combination.

In a case where the liquid medium is a mixed solvent of water and an organic solvent, the content of water is preferably from 10 to 99 mass %, particularly preferably from 20 to 99 mass %, to the total mass of the liquid medium.

In a case where the liquid medium is a mixed solvent of water and an organic solvent, the content of the organic solvent is preferably from 1 to 90 mass %, particularly preferably from 1 to 80 mass %.

When the contents of water and the organic solvent are within the above ranges, a polymer electrolyte membrane having excellent dispersibility or solubility of the polymer H in the liquid medium and being hardly breakable will easily be obtainable.

The content of polymer H is preferably from 1 to 50 mass %, particularly preferably from 3 to 30 mass %, to the total mass of the liquid composition. When it is at least the lower limit value in the above range, a thick membrane can be stably obtained at the time of formation of a membrane. When it is at most the upper limit value in the above range, the viscosity of the liquid composition will become proper.

The liquid composition may contain at least one type of metal, metal compound or metal ion selected from the group consisting of cerium and manganese in order to further improve the durability of the electrolyte membrane made from the liquid composition.

(Polymer Electrolyte Membrane)

The polymer electrolyte membrane of the present invention, contains polymer H.

The polymer electrolyte membrane of the present invention contains polymer H, whereby it is excellent in conductivity and mechanical strength in a high temperature environment.

The membrane thickness of the polymer electrolyte membrane is preferably from 5 to 200 μm, particularly preferably from 10 to 130 μm. When it is at least the lower limit value in the above range, a sufficient hydrogen gas barrier property can be secured. When it is at most the upper limit value in the above range, the membrane resistance can be made to be sufficiently low.

The polymer electrolyte membrane may be reinforced by a reinforcing material. As specific examples of the reinforcing material, porous bodies, fibers, woven fabrics, and non-woven fabrics may be mentioned.

The reinforcing material is preferably made from at least one type of material selected from the group consisting of polytetrafluoroethylene (hereinafter referred to also as "PTFE"), a tetrafluoroethylene-perfluoroalkyl vinyl ether copolymer (hereinafter referred to also as "PEA"), polyether ether ketone (hereinafter referred to also as "PEEK") and polyphenylene sulfide (hereinafter referred to also as "PPS").

The polymer electrolyte membrane may contain at least one type of metal, metal compound or metal ion selected from the group consisting of cerium and manganese in order to further improve the durability. Cerium and manganese will decompose hydrogen peroxide, hydroxyl radical, or hydroperoxyl radical, which is a causative substance that causes deterioration of the polymer electrolyte membrane.

The polymer electrolyte membrane may contain silica or a heteropolyacid (for example, zirconium phosphate, phosphomolybdic acid, phosphotungstic acid, etc.), as a water retention agent for preventing drying.

An example of a method for producing a polymer electrolyte membrane may be a method (cast method) in which the above-mentioned liquid composition is applied to the surface of a base film or a catalyst layer and dried.

An example of a production method when the polymer electrolyte membrane contains a reinforcing material may be a method in which the reinforcing material is impregnated with the above-mentioned liquid composition and dried.

It is preferred to conduct heat treatment in order to stabilize the polymer electrolyte membrane. The heat treatment temperature is preferably from 130 to 200° C. although it may depend on the type of polymer H. When the heat treatment temperature is at least 130° C., the water uptake of polymer H will be proper. When the heat treatment temperature is at most 200° C., the thermal decomposition of the sulfonic acid groups will be suppressed, and the excellent conductivity of the polymer electrolyte membrane can be maintained.

The polymer electrolyte membrane may be treated with aqueous hydrogen peroxide solution, as the case requires.

(Membrane Electrode Assembly)

The membrane electrode assembly of the present invention comprises an anode having a catalyst layer, a cathode having a catalyst layer and the above polymer electrolyte membrane disposed between the anode and the cathode.

Hereinafter, an example of the membrane electrode assembly of the present invention will be described with reference to the drawing.

FIG. 1 is a schematic cross-sectional view showing an example of the membrane electrode assembly of the present invention. The membrane electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14, in contact with the catalyst layers 11.

A specific example of the catalyst layer 11 may be a layer containing a catalyst and a polymer having ion exchange groups.

A specific example of the catalyst may be a supported catalyst in which platinum, a platinum alloy or a catalyst containing platinum with a core-shell structure, is supported on a carbon carrier, an iridium oxide catalyst, an alloy containing iridium oxide, or a catalyst containing iridium oxide having a core-shell structure. As the carbon carrier, carbon black powder may be mentioned.

As the polymer having ion exchange groups, a fluorinated polymer having ion exchange groups may be mentioned, and it is also preferred to use the above-described polymer H.

In a case where as the polymer having ion exchange groups to be contained in the catalyst layer 11, the above-described polymer H is to be used, at least one of the polymer having ion exchange groups contained in the catalyst layer of the anode and the polymer having ion exchange groups contained in the catalyst layer of the cathode, may be polymer H.

The gas diffusion layer 12 has a function to uniformly diffuse gas in the catalyst layer and a function as a current collector. Specific examples of the gas diffusion layer may be carbon paper, carbon cloth, carbon felt, and a titanium porous body (specifically sintered product of titanium particles or fibers, etc.).

In a case to be used for a membrane electrode assembly for a fuel cell, the gas diffusion layer is preferably treated for water repellency with e.g. PTFE, in order to prevent stagnation of water to be formed. In a case to be used for a membrane electrode assembly for water electrolysis, the gas diffusion layer may be, in order to prevent adhesion of the gas to be formed, treated for water repellency with e.g. PTFE, or treated for hydrophilicity with e.g. a polymer having ion exchange groups.

Although the gas diffusion layer 12 is contained in the membrane electrode assembly in FIG. 1, the gas diffusion layer is an optional member and may not be contained in the membrane electrode assembly.

The polymer electrolyte membrane 15 is a polymer electrolyte membrane containing the above-described polymer H.

The anode 13 and the cathode 14 may have another member other than the above.

As a specific example of another member, a carbon layer (not shown) to be provided between the catalyst layer 11 and the gas diffusion layer 12 may be mentioned. When the carbon layer is disposed, the gas diffusion property at the surface of the catalyst layer 11 will be improved, whereby it is possible to further improve the power generation performance of the fuel cell.

The carbon layer may, for example, comprise carbon and a nonionic fluorinated polymer. As a specific example of carbon, a carbon nanofiber having a fiber diameter of from 1 to 1,000 nm and a fiber length of at most 1,000 μm is preferred. As a specific example of the nonionic fluorinated polymer, PTFE may be mentioned.

The method for producing the membrane electrode assembly may, for example, be a method of forming catalyst layers on a polymer electrolyte membrane and further sandwiching the obtained assembly by gas diffusion layers, or a method of forming a catalyst layer on a gas diffusion layer to form electrodes (an anode and cathode), and sandwiching a polymer electrolyte membrane by the electrodes.

Here, the method for producing the catalyst layer may be a method in which a coating liquid for forming a catalyst layer is applied to a predetermined position and dried as the case requires. The coating liquid for forming a catalyst layer is a liquid having a polymer having ion exchange groups and a catalyst, dispersed in a dispersion medium.
(Polymer Electrolyte Fuel Cell)

Since the polymer electrolyte fuel cell of the present invention contains the above-described membrane electrode assembly, it is excellent in power generation performance and durability.

The polymer electrolyte fuel cell of the present invention may have, on both sides of the membrane electrode assembly, separators having grooves formed as gas flow paths.

As specific examples of the separator, a separator made of metal, a separator made of carbon, a separator made of material having graphite and a resin mixed, and a separator made of various conductive materials, may be mentioned.

In the polymer electrolyte fuel cell, the power generation is conducted by supplying a gas containing oxygen to the cathode, and a gas containing hydrogen to the anode.

Further, the above-described membrane electrode assembly may also be applied to a methanol fuel cell whereby the power generation is conducted by supplying methanol to the anode.
(Other Applications)

The sulfonic acid group-containing polymer of the present invention can be used widely for electrochemical cells, and, for example, a catalyst layer or polymer electrolyte membrane in a membrane electrode assembly for a polymer electrolyte water electrolysis, a cation exchange membrane to be used for chlor-alkali electrolysis or electrodialysis, an ion exchange membrane to be used for water electrolysis, a diaphragm for a redox flow secondary battery, and an ion exchange membrane for electrochemical hydrogen pump to be used for hydrogen purification or hydrogen compression, may be mentioned.

EXAMPLES

Hereinafter, the present invention will be specifically described with reference to Examples. Ex. 3 to 6 are Examples of the present invention, and Ex. 7 to 11 are Comparative Examples. However, the present invention is not limited to these Examples.

In the following, a "polymer H" is a generic term for a sulfonic acid group-containing polymer according to an Example of the present invention, and a fluorosulfonyl group-containing polymer being its precursor will be collectively referred to as a "polymer F". Further, a "polymer H'" is a generic term for a sulfonic acid group-containing polymer according to a Comparative Example, and a fluorosulfonyl group-containing polymer being its precursor will be collectively referred to as a "polymer F'".
($^{1}$H-NMR)

$^{1}$H-NMR was measured under the conditions of frequency: 300.4 MHz and chemical shift standard: tetramethylsilane. As the solvent, CD$_3$CN was used unless otherwise specified. The quantification of the product was carried out from the analysis result of $^{1}$H-NMR and the added amount of the internal standard sample (1,3-bis(trifluoromethyl)benzene).
($^{19}$F-NMR)

$^{19}$F-NMR was measured under the conditions of frequency: 282.7 MHz, solvent: CD$_3$CN, and chemical shift standard: CFCl$_3$. The quantification of the product was carried out from the analysis result of $^{19}$F-NMR and the added amount of the internal standard sample (1,3-bis(trifluoromethyl)benzene).
($^{13}$C-NMR)

$^{13}$C-NMR was measured under the conditions of frequency: 75.5 MHz and chemical shift standard: tetramethylsilane. As the solvent, CD$_3$CN was used unless otherwise specified.
(Yield)

Yield means the yield in the reaction step×the yield in the purification step. The reaction yield means a yield of only the yield in the reaction step before purifying the target product, which does not include the loss in the purification step.
(Ion Exchange Capacity)

The ion exchange capacity (meq/g dry resin) of polymer H or polymer H' was obtained as follows.

A membrane of polymer F or polymer F' was vacuum-dried at 120° C. for 12 hours. The mass of the membrane of the polymer after drying was measured, and then, the membrane of the polymer was immersed in a 0.85 mol/g sodium hydroxide solution (solvent:water/methanol=10/90 (mass ratio)) at 60° C. for at least 72 hours, to hydrolyze the ion exchange groups. The sodium hydroxide solution after the hydrolysis was back-titrated with 0.1 mol/L hydrochloric acid to obtain the ion exchange capacity of polymer F or polymer F'. In this specification, the ion exchange capacity of polymer H or polymer H' is the same as the ion exchange capacity of polymer F or polymer F' as its precursor.
(Proportions of Respective Units)

The proportions of the respective units in polymer F or polymer F' were calculated from $^{19}$F-NMR of polymer F or polymer F'. However, in the above-mentioned $^{19}$F-NMR measurement, as the solvent, hexafluorobenzene was used instead of CD$_3$CN, and the measurement was performed by external locking using deuterated acetone.

The proportions of the respective units in polymer H or polymer H' are the same as the proportions of the corresponding respective units in polymer F or polymer F'.
(Softening Temperature)

With respect to a polymer electrolyte membrane, using a dynamic viscoelasticity measuring apparatus (manufactured by IT Keisoku Seigyo K.K., DVA-225), the dynamic viscoelastic measurement was conducted under the conditions of sample width: 5.0 mm, length between grips: 15 mm, measurement frequency: 1 Hz, heating rate: 2° C./min, and tensile mode. Tan δ (tangent loss) was calculated from the ratio (E"/E') of loss modulus E" to storage modulus E', and a tan δ-temperature curve was prepared. A value obtained by reading the peak temperature between −100 to 200° C. from the tan δ-temperature curve, was adopted as the softening temperature. Here, the standard dimensions and membrane thickness of the membrane used in the calculation were measured under the conditions of temperature: 23° C. and relative humidity: 50% RH.

Here, the polymer electrolyte membrane in the present Example, is a membrane made of polymer H or H'. Therefore, the softening temperature of the polymer electrolyte membrane measured in an Example, is the same value as the softening temperature measured by using the membrane made of polymer H or H'.

Further, in the following Table 1, a case where the softening temperature range satisfies from 120 to 140° C. was evaluated as ○, and a case where it does not satisfy from 120 to 140° C. was evaluated as ×.
(TQ Value)

Using a flow tester (manufactured by Shimadzu Corporation, CFT-500A) equipped with a nozzle having a length of 1 mm and an inner diameter of 1 mm, polymer F or polymer F' was melt-extruded while changing the temperature under the condition of an extrusion pressure of 2.94 MPa (gauge pressure). A temperature (TQ value) where the extrusion amount of polymer F or polymer F' became to be 100 mm$^3$/sec. was obtained. When the TQ value exceeded 300° C., the TQ value was obtained by extrapolating from the measured value of the extrusion amount of at most 300° C. Extrapolation was performed by a logarithmic approximation of the correlation of extrusion amount with respect to the reciprocal of absolute temperature. The higher the TQ value, the larger the molecular weight of the polymer.

(Conductivity)

By bringing a substrate having four terminal electrodes disposed at 5 mm intervals, into close contact with a membrane of polymer H or polymer H' having a width of 5 mm, by a known four terminal method, under the constant temperature and humidity conditions of temperature: 80° C. and relative humidity: 50%, the resistance of the membrane of polymer H or polymer H' was measured at AC: 10 kHz and voltage: 1V, whereupon the conductivity was calculated. Here, the standard dimensions and membrane thickness of the membrane used in the calculation were measured under the conditions of temperature: 23° C. and relative humidity: 50% RH.

(Hydrogen Gas Permeation Coefficient)

With respect to a polymer electrolyte membrane, the hydrogen gas permeation coefficient was measured in accordance with JIS K7126-2: 2006. As the measuring device, a gas transmission rate measuring device (manufactured by GTR Tech Co., Ltd., GTR-100XFAG) was used.

A polymer electrolyte membrane having an effective permeation area of 9.62 cm$^2$ was maintained at 80° C.; on the first surface, hydrogen gas having the relative humidity adjusted to be 10% was permitted to flow at 30 mL/min, and on the second surface, argon gas having the relative humidity adjusted to be 10% was permitted to flow at 30 mL/min, whereby hydrogen gas permeated to the argon gas was detected by gas chromatography, to measure the hydrogen gas permeation amount converted to volume at 25° C. under 1 atm. Using the obtained hydrogen gas permeation amount, the permeability of the gas permeated per second per 1 cm$^2$ of membrane area and 1 cm Hg of permeated gas pressure difference, was obtained, and the value converted to a 1 cm thick membrane was adopted as the hydrogen gas permeation coefficient. Here, the standard dimensions and membrane thickness of the membrane used in the calculation were measured under the conditions of temperature: 23° C. and relative humidity: 50% RH.

Here, the polymer electrolyte membrane in the present Example is a membrane made of polymer H or H'. Therefore, the hydrogen gas permeation coefficient of the polymer electrolyte membrane, measured in an Example, is the same value as the hydrogen gas permeation coefficient measured by using a membrane made of polymer H or H'.

(Abbreviations)

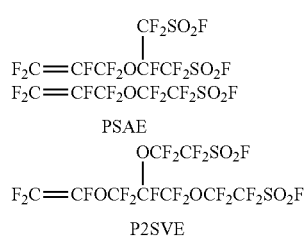

PSAE

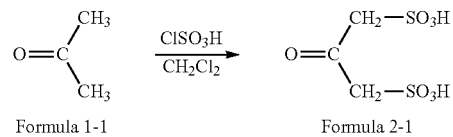

P2SVE

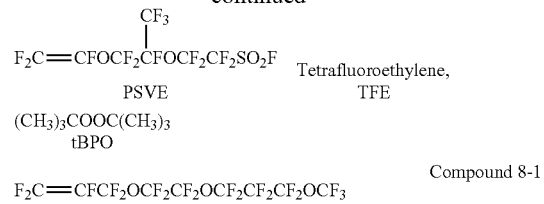

PSVE    Tetrafluoroethylene, TFE (CH$_3$)$_3$COOC(CH$_3$)$_3$
tBPO

Compound 8-1

F$_2$C═CFCF$_2$OCF$_2$CF$_2$OCF$_2$CF$_2$CF$_2$OCF$_3$

Here, the above compound 7-1 and compound 8-1, were synthesized by the following methods.

Ex. 1

Ex. 1-1

Into a 2 L four-necked flask equipped with a stirrer, a condenser, a thermometer and a dropping funnel, 560 g of chlorosulfonic acid was charged under nitrogen gas sealing. The flask was cooled in an ice bath, and while maintaining the internal temperature to be at most 20° C., a mixed solution of 139.5 g of compound 1-1 and 478.7 g of dichloromethane, was added dropwise over 20 minutes. During the dropwise addition, heat generation and gas generation were observed. After the dropwise addition was completed, the flask was set in an oil bath, and the reaction was conducted for 7 hours while maintaining the internal temperature at from 30 to 40° C. The reaction proceeded with the generation of gas, and a white solid was precipitated. After the reaction, the pressure inside the flask was reduced, and dichloromethane was distilled off. A yellowish white solid remained in the flask. The solid was analyzed by $^1$H-NMR, whereby it was confirmed that compound 2-1 was formed.

$$O=C\begin{matrix}CH_3\\CH_3\end{matrix} \xrightarrow{\underset{CH_2Cl_2}{ClSO_3H}} O=C\begin{matrix}CH_2-SO_3H\\CH_2-SO_3H\end{matrix}$$

Formula 1-1            Formula 2-1

NMR spectrum of compound 2-1:
$^1$H-NMR (solvent: D$_2$O): 4.27 ppm (—CH$_2$—, 4H, s).
$^{13}$C-NMR (solvent: D$_2$O): 62.6 ppm (—CH$_2$—), 195.3 ppm (C═O).

Ex. 1-2

Compound 2-1 obtained in Ex. 1-1 was used directly in the next reaction without being isolated. Into the flask in Ex. 1, 2,049 g of thionyl chloride was added. The flask was heated to 80° C. and refluxed for 15 hours. As the reaction progressed, the reflux temperature increased from 52° C. to 72° C. Gas generation was confirmed during the reaction. The point at which compound 2-1 was all dissolved, and gas generation was subsided, was taken as the reaction end point. The reaction solution was transferred to a 2 L separable flask, and left to cool for 9 hours while the gas phase was sealed with nitrogen gas, whereby a dark brown solid was precipitated in the separable flask. By decantation, unreacted thionyl chloride was removed. Toluene was added to wash the precipitated solid, and again by decantation, the toluene was removed. Toluene washing was carried out a total of 3 times, and the total amount of toluene used was 1,207 g. The precipitated solid was dried at 25° C. for 71 hours under a nitrogen gas stream. The solid after the drying was collected and was analyzed by $^1$H-NMR, whereby it was confirmed that 356.5 g of compound 3-1 with a purity of 96.2% was obtained. The yield based on compound 1-1 became to be 56.0%.

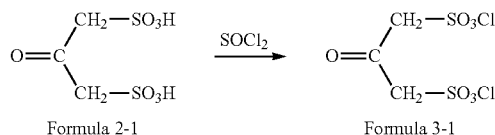

Formula 2-1  Formula 3-1

NMR spectrum of compound 3-1:
$^1$H-NMR: 5.20 ppm (—CH$_2$—, 4H, s).
$^{13}$C-NMR: 72.3 ppm (—CH$_2$—), 184.6 ppm (C=O).

Ex. 1-3

Into a 1 L four-necked flask equipped with a stirrer, a condenser and a thermometer, 90.0 g of compound 3-1 and 750 mL of acetonitrile were charged under nitrogen gas sealing. The flask was cooled in an ice bath, and 110.3 g of potassium hydrogen fluoride was added with stirring. The heat generation associated with the addition was slight. The ice bath was changed to a water bath, and the reaction was carried out for 62 hours while maintaining the internal temperature at from 15 to 25° C. Along with the reaction, a fine white solid was produced. The reaction solution was transferred to a pressure filter, and unreacted potassium hydrogen fluoride and the product were separated by filtration. Acetonitrile was added to the filter, and the separated solid was washed until the filtrate became transparent, whereupon the washing solution was recovered. The filtrate and washing solution were subjected to an evaporator to distill off acetonitrile. 950 mL of toluene was added to the solid remaining after the drying, and the mixture was heated to 100° C. to dissolve the solid in toluene. The dissolved solution was filtered by gravity filtration to remove undissolved components. The filtrate was transferred to a 1 L separable flask, and left to cool for 14 hours while the gas phase was sealed with nitrogen gas, whereby light brown needle-like crystals were precipitated in the separable flask. The crystals were washed with toluene and dried at 25° C. for 30 hours under a nitrogen gas stream. The solid after the drying was recovered and analyzed by $^1$H-NMR and $^{19}$F-NMR, whereby it was confirmed that 58.1 g of compound 4-1 with a purity of 97.6% was obtained. The yield based on compound 3-1 became to be 72.3%.

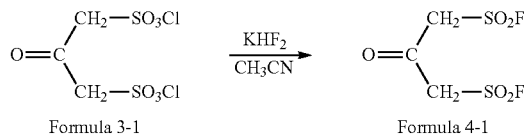

Formula 3-1  Formula 4-1

NMR spectrum of compound 4-1:
$^1$H-NMR: 4.97 ppm (—CH$_2$—, 4H, d, J=3.1 Hz).
$^{19}$F-NMR: 62.4 ppm (—SO$_2$F, 2F, t, J=3.1 Hz).
$^{13}$C-NMR: 60.7 ppm (—CH$_2$—), 184.9 ppm (C=O).

Ex. 1-4

Into a 200 mL nickel autoclave, 9.93 g of compound 4-1 and 89.7 g of acetonitrile were charged. The autoclave was cooled, and while maintaining the internal temperature to be from 0 to 5° C., nitrogen gas was fed at a flow rate of 6.7 L/hr, whereupon the reaction solution was bubbled for 1 hour. While maintaining the temperature of the reaction solution to be from 0 to 5° C., a mixed gas of fluorine gas and nitrogen gas (mixing ratio=10.3 mol %/89.7 mol %) was introduced at a flow rate of 6.7 L/hr over 6 hours. Nitrogen gas was fed again at a flow rate of 6.7 L/hr, and the reaction solution was bubbled for 1 hour. From the autoclave, 103.2 g of the reaction solution was recovered. The reaction solution was quantitatively analyzed by $^{19}$F-NMR, whereby it was confirmed that compound 5-1 was contained at 8.4 mass %. The reaction yield based on compound 4-1 became to be 66%.

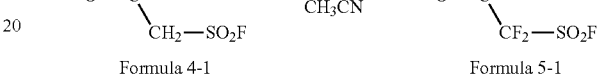

Formula 4-1  Formula 5-1

NMR spectrum of compound 5-1:
$^{19}$F-NMR: −104.1 ppm (—CF$_2$—, 4F, s), 45.8 ppm (—SO$_2$F, 2F, s).

Ex. 1-5

Into a 200 mL nickel autoclave, 19.9 g of compound 4-1 and 85.6 g of acetonitrile were charged. The autoclave was cooled, and while maintaining the internal temperature to be from 0 to 5° C., nitrogen gas was fed at a flow rate of 6.7 L/hr, whereupon the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 16.4 L/hr over 6.5 hours. Nitrogen gas was again fed at a flow rate of 6.7 L/hr, and the reaction solution was bubbled for 1 hour. From the autoclave, 109.6 g of the reaction solution containing compound 5-1 was recovered.

Ex. 1-6

Into a 200 mL nickel autoclave, 20.1 g of compound 4-1 and 80.1 g of acetonitrile were charged. The autoclave was cooled, and while maintaining the internal temperature to be from 0 to 5° C., nitrogen gas was fed at a flow rate of 6.7 L/hr, whereupon the reaction solution was bubbled for 1 hour. While maintaining the temperature of the reaction solution at from 0 to 5° C., a mixed gas of fluorine gas and nitrogen gas (mixing ratio=20.0 mol %/80.0 mol %) was introduced at a flow rate of 8.4 L/hr over 6 hours. Nitrogen gas was again fed at a flow rate of 6.7 L/hr, and the reaction solution was bubbled for 1 hour. From the autoclave, 107.1 g of the reaction solution containing compound 5-1 was recovered.

Ex. 1-7

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath, and while maintaining the internal temperature to be from 0 to 10° C. with stirring, 8.43 g of the reaction solution obtained in Ex. 1 to 4 was added dropwise by using a plastic syringe. Strong heat generation was confirmed, and it took 15 minutes for the dropwise addition. After the dropwise addition was completed, the ice bath was replaced with a water bath, and the reaction was carried out at from 15 to 20° C. for 1 hour. The flask was again cooled in an ice bath, and while maintaining the temperature of the reaction solution to be from 0 to 10° C., from the dropping funnel, 6.56 g of compound 6-1 was added dropwise. After the dropwise addition was completed, the ice bath was replaced with a water bath and the reaction was carried out at from 20 to 25° C. for 3.5 hours. A by-product solid was removed from the reaction solution by suction filtration, and the filtrate was recovered. The filtered residual solid was washed with a suitable amount of acetonitrile, and the washing liquid was mixed with the filtrate. 37.1 g of the filtrate was quantitatively analyzed by $^{19}$F-NMR, whereby it was confirmed that compound 7-1 was contained in an amount of 2.04 mass %. The reaction yield based on compound 4-1 became to be 46.6%.

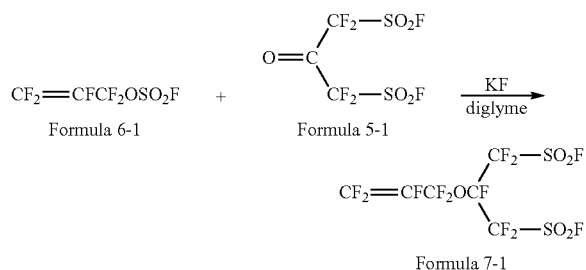

NMR spectrum of compound 7-1:
$^{19}$F-NMR:−191.5 ppm (CF$_2$=CF—, 1F, ddt, J=116, 38, 14 Hz), −133.8 ppm (—O—CF—, 1F, tt, J=21.3, 6.1 Hz), −103.1 ppm (—CF$_2$—SO$_2$F, 4F, m), −101.5 ppm (CF$_2$=CF—, 1F, ddt, J=116, 49, 27 Hz), −87.6 ppm (CF$_2$=CF—, 1F, ddt, J=49, 38, 7 Hz), −67.5 ppm (—CF$_2$—O—, 2F, m), 46.8 ppm (—SO$_2$F, 2F, s).

Ex. 1-8

Into a 500 mL four-necked flask equipped with a stirrer, a condenser, a thermometer and a dropping funnel, 36.6 g of potassium fluoride and 125.6 g of acetonitrile were charged. The flask was cooled in an ice bath, and while maintaining the internal temperature to be from 0 to 10° C. with stirring, 79.8 g of the reaction solution obtained in Ex. 1-5 was added dropwise by using a plastic dropping funnel. Strong heat generation was confirmed, and it took 23 minutes for the dropwise addition. After the dropwise addition was completed, the ice bath was replaced with a water bath, and the reaction was carried out at from 20 to 30° C. for 5.5 hours. The flask was again cooled in an ice bath, and while maintaining the temperature of the reaction solution to be from 0 to 10° C., 146.0 g of compound 6-1 was added dropwise from the dropping funnel. After the dropwise addition was completed, the ice bath was replaced with a water bath, and the reaction was carried out at from 15 to 25° C. for 16 hours. In the same manner as in Ex. 1-7, suction filtration was conducted, and 412.3 g of the obtained filtrate was quantitatively analyzed by $^{19}$F-NMR, whereby it was confirmed that compound 7-1 was contained in an amount of 3.93 mass %. The reaction yield based on compound 4-1 became to be 55.9%. By vacuum distillation of the filtrate, compound 7-1 was isolated as a fraction with a boiling point of 97.2° C./10 kPa (absolute pressure). The gas chromatographic purity was 98.0%.

Ex. 1-9

Into a 50 mL four-necked flask equipped with a stirrer, a condenser, a thermometer and a dropping funnel, 3.70 g of potassium fluoride and 10.9 g of acetonitrile were charged. The flask was cooled in an ice bath, and while maintaining the internal temperature to be from 0 to 10° C. with stirring, 10.2 g of the reaction solution obtained in Ex. 1-6 was added dropwise by using a plastic syringe. Strong heat generation was confirmed, and it took 8 minutes for the dropwise addition. After the dropwise addition was completed, the ice bath was replaced with a water bath, and the reaction was carried out at from 20 to 30° C. for 3 hours. The flask was again cooled in an ice bath, and while maintaining the temperature of the reaction solution to be from 0 to 10° C., 14.6 g of compound 6-1 was added dropwise from the dropping funnel. After the dropwise addition was completed, the ice bath was replaced with a water bath, and the reaction was carried out at from 15 to 25° C. for 17 hours. In the same manner as in Ex. 1-7, suction filtration was conducted, and 55.9 g of the obtained filtrate was quantitatively analyzed by $^{19}$F-NMR, whereby it was confirmed that compound 7-1 was contained in an amount of 4.77 mass %. The reaction yield based on compound 4-1 became to be 69.6%. Further, the reaction yield based on compound 1-1 (reaction yield over the entire monomer synthesis step) became to be 28.2%.

Ex. 2

Compound 8-1 is obtained in accordance with the method disclosed in JP-A-2003-518052. The gas chromatographic purity is 99.0%.

Ex. 3

Into an autoclave (internal capacity 100 mL, made of stainless steel), 46.8 g of compound 7-1 and 23.2 g PSAE were put, and cooled with liquid nitrogen and degassed. While heating in an oil bath until the internal temperature became to be 160° C., nitrogen gas was introduced into the gas phase, to 0.33 MPa (gauge pressure). Introduction of TFE into the autoclave was started, and the pressure was brought to be 0.82 MPa. The TFE partial pressure became to be 0.49 MPa. A 0.12 mass % solution of tBPO dissolved in the liquid having compound 7-1 and PSAE mixed in a ratio of 66.9/33.1% (mass ratio), was intermittently added from an injection line at the initiation of polymerization and every 30 minutes. (The total amount of the polymerization initiator added became 4.5 mg, and the total amount of compound 7-1 and PSAE added became 73.8 g). While maintaining the pressure to be 0.82 MPa pressure (gauge pressure), TFE was continuously added to carry out the polymerization. When the addition amount of TFE became 5.09 g in 5 hours, the inside of the autoclave was cooled to stop the polymerization, and the gas in the system was purged. The reaction solution was diluted with HFC-52-13p, and then, HFE-347pc-f was added to precipitate the polymer, followed by filtration. Then, an operation of stirring the polymer in HFC-52-13p, and reprecipitating it in HFE-347pc-f, was repeated twice. By vacuum drying at 120° C., polymer F having units u4 based on compound 7-1, units u5 based on PSAE and units u6 based on TFE, was obtained.

The polymer F was subjected to press molding at a predetermined temperature and pressure, to obtain membranes of polymer F (thickness 25, 50, and 100 µm). The membranes of polymer F were immersed in an aqueous alkali solution to hydrolyze —SO$_2$F groups in polymer F to convert them to —SO$_3$K groups, and further, the membranes of the polymer were immersed in an aqueous hydrochloric acid solution and then immersed in ultrapure water, to convert the —SO$_3$K groups in the polymer to —SO$_3$H groups, and thus to obtain membranes of polymer H having units u1 based on compound 7-1, units u2 based on PSAE and units u3 based on TFE.

Ex. 4

Into an autoclave (internal capacity 100 mL, made of stainless steel), 39.3 g of the compound 7-1 and 35.7 g of PSAE were put, and cooled with liquid nitrogen and degassed. While heating in an oil bath until the internal temperature became 160° C., nitrogen gas was introduced into the gas phase to 0.35 MPa (gauge pressure). Introduction of TFE into the autoclave was started to bring the pressure to be 0.84 MPa. The TFE partial pressure became to be 0.49 MPa. A 0.12 mass % solution of tBPO dissolved in the liquid having compound 7-1 and PSAE mixed in a ratio of 52.4/47.6% (mass ratio), was intermittently added from a injection line at the initiation of polymerization and every 30 minutes. (The total amount of the polymerization initiator added became 5.5 mg, and the total amount of compound 7-1 and PSAE added became 79.6 g). While maintain the pressure to be 0.84 MPa (gauge pressure), TFE was continuously added to carry out the polymerization. When the amount of TFE added became 6.7 g in 6 hours, the inside of the autoclave was cooled to stop the polymerization, and the gas in the system was purged. Otherwise, in the same manner as in Ex. 3, polymer F having units 4 based on compound 7-1, units u5 based on PSAE, and units u6 based on TFE, was obtained.

The polymer F was subjected to press-molding at 260° C. and 4 MPa (gauge pressure), to obtain membranes of polymer F (thickness 25, 50, and 100 µm). The membranes of polymer F were immersed in an alkaline aqueous solution (potassium hydroxide/water=20/80 (mass ratio)) at 80° C. for 16 hours, to hydrolyze —SO$_2$F groups of polymer F and convert them to —SO$_3$K groups. Further, the membranes of the polymer were immersed in a 3 mol/L aqueous hydrochloric acid solution, and then immersed in ultra-pure water, to convert the —SO$_3$K groups of the polymer to —SO$_3$H groups. Thereafter, the membranes of the polymer was immersed in a 8 mass % aqueous hydrogen peroxide solution at 80° C. for 16 hours. After immersing them in a 3 mol/L hydrochloric acid aqueous solution at 50° C. for 30 minutes, they were immersed in ultrapure water at 80° C. for 30 minutes. The cycle of immersion in immersion in the aqueous hydrochloric acid solution and the immersion in the ultra-pure water was carried out five times in total, and washing by ultrapure water was repeated until pH of the water in which the membranes of the polymer were immersed, became 7. The membranes of the polymer were wrapped in a filter paper and dried, to obtain membranes of polymer H having units u1 based on compound 7-1, unit u2 based on PSAE and units u3 based on TFE.

Ex. 5

Into an autoclave (internal capacity 110 mL, made of stainless steel), 55.4 g of compound 7-1 and 16.1 g of compound 8-1 were put, and cooled with liquid nitrogen and degassed. While heating in an oil bath until the internal temperature became 160° C., nitrogen gas was introduced into the gas phase to 0.39 MPa (gauge pressure). Introduction of TFE into the autoclave was started to bring the pressure to be 0.82 MPa. The TFE partial pressure became to be 0.43 MPa. A 0.12 mass % solution of tBPO dissolved in the liquid having compound 7-1 and compound 8-1 mixed in a ratio of 79.1/20.9% (mass ratio), was intermittently added from a injection line at the initiation of polymerization and every 30 minutes. (The total amount of the polymerization initiator added became 4.5 mg, and the total amount of compound 7-1 and compound 8-1 added became 73.8 g). While maintain the pressure to be 0.82 MPa (gauge pressure), TFE was continuously added to carry out the polymerization. When the amount of TFE added became 5.2 g in 5 hours, the inside of the autoclave was cooled to stop the polymerization, and the gas in the system was purged. Otherwise, in the same manner as in Ex. 4, polymer F having units 1 based on compound 7-1, units u2 based on compound 8-1, and units u3 based on TFE, and membranes of polymer H were obtained.

Ex. 6

Into an autoclave (internal capacity 110 mL, made of stainless steel), 54.7 g of compound 7-1 and 15.3 g of compound 8-1 were put, and cooled with liquid nitrogen and degassed. While heating in an oil bath until the internal temperature became 160° C., nitrogen gas was introduced into the gas phase to 0.53 MPa (gauge pressure). Introduction of TFE into the autoclave was started to bring the pressure to be 0.82 MPa. The TFE partial pressure became to be 0.29 MPa. A 0.12 mass % solution of tBPO dissolved in the liquid having compound 7-1 and compound 8-1 mixed in a ratio of 78.1/21.9% (mass ratio), was intermittently added from a injection line at the initiation of polymerization and every 30 minutes. (The total amount of the polymerization initiator added became 2.6 mg, and the total amount of compound 7-1 and compound 8-1 added became 72.2 g). While maintain the pressure to be 0.82 MPa (gauge pressure), TFE was continuously added to carry out the polymerization. When the amount of TFE added became 1.8 g in 5 hours, the inside of the autoclave was cooled to stop the polymerization, and the gas in the system was purged. Otherwise, in the same manner as in Ex. 4, polymer F, and membranes of polymer H were obtained.

Ex. 7

Into an autoclave (internal capacity 100 mL, made of stainless steel), 104.9 g of compound 7-1 was put, and cooled with liquid nitrogen and degassed. The autoclave was heated in an oil bath until the internal temperature became to be 125° C. The pressure at that time was −0.09 MPa (gauge pressure). TFE was introduced into the autoclave, and the pressure was brought to be 0.36 MPa. The TFE partial pressure became to be 0.45 MPa. A mixed solution of 21.7 mg of tBPO and 3.05 g of HFC-52-13p being polymerization initiators was injected into the autoclave. Further, from a injection line, nitrogen gas was introduced to completely inject the injecting liquid in the injection line. By this operation, TFE in the gas phase was diluted, whereby the pressure was increased to 0.67 MPa (gauge pressure). While maintaining the pressure to be 0.67 MPa (gauge pressure), TFE was continuously added to carry out polymerization. When the addition amount of TFE became to be 7.65 g in 10.5 hours, the inside of the autoclave was cooled to stop the polymerization, and the gas in the system was purged. Otherwise, the same procedure as in Ex. 3 was carried out, to obtain membranes of polymer F' having units based on compound 7-1 and units based on TFE, and then, the same procedure as in Ex. 3 was carried out, to obtain membranes of polymer H'.

Ex. 8

Into an autoclave (internal capacity 100 mL, made of stainless steel), 69.6 g of compound 7-1 was put, and cooled with liquid nitrogen and degassed. While heating the autoclave in an oil bath until the internal temperature became to be 160° C., nitrogen gas was introduced into the gas phase to 0.30 MPa (gauge pressure). Introduction of TFE into the autoclave was started, and the pressure was made to be 0.80 MPa. The TFE partial pressure became to be 0.50 MPa. A 0.2 mass % solution of tBPO dissolved in compound 7-1, was intermittently added from a injection line at the initiation of the polymerization and every 30 minutes. (The total amounts of the polymerization initiator and compound 7-1 added became 6.29 mg and 72.6 g respectively). While maintaining the pressure to be 0.80 MPa (gauge pressure), TFE was continuously added to carry out the polymerization. When the amount of TFE added became to be 6.85 g in 8.5 hours, the inside of the autoclave was cooled to stop the polymerization, and the gas in the system was purged. Otherwise, the same procedure as in Ex. 3 was carried out to obtain membranes of polymer F' having units based on compound 7-1 and units based on tetrafluoroethylene, and then, the same procedure as in Ex. 3 was carried out to obtain membranes of polymer H'.

Ex. 9

P2SVE and TFE in amounts as shown in Table 1, were copolymerized by a known method to obtain polymer F', and then, the same procedure as in Ex. 3 was carried out to obtain membranes of polymer H'.

Ex. 10 and 11

P2SVE, PSVE and TFE in amounts as shown in Table 1, were copolymerized by a known method to obtain polymer F', and then, the same procedure as in Ex. 3 was carried out to obtain membranes of polymer H'.

The measurement results of the membranes of the polymers obtained in Ex. 3 to 11, are shown in the following Table 1.

TABLE 1

|  |  | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|
| [u1] Comonomer species |  | Compound 7-1 | Compound 7-1 | Compound 7-1 | Compound 7-1 | Compound 7-1 | Compound 7-1 | P2SVE | P2SVE | P2SVE |
| [u1] Comonomer | mol % | 11.8 | 8.8 | 17.8 | 23.2 | 15.1 | 19.8 | 19.6 | 9.7 | 15.3 |
| [u2] Comonomer species |  | PSAE | PSAE | Compound 8-1 | Compound 8-1 | — | — | — | PSVE | PSVE |
| [u2] Comonomer | mol % | 8.3 | 11.6 | 4.2 | 5.9 | — | — | — | 8.0 | 1.7 |
| TFE | mol % | 79.9 | 79.6 | 78.0 | 70.9 | 84.9 | 80.2 | 80.4 | 82.3 | 83.0 |
| U2/(U1 + U2) | Molar ratio | 0.41 | 0.57 | 0.19 | 0.20 | — | — | — | 0.45 | 0.10 |
| Ion exchange capacity | meq/g dry resin | 2.01 | 1.87 | 2.01 | 2.29 | 1.99 | 2.35 | 1.93 | 1.54 | 1.74 |
| TQ value | ° C. | 319 | 315 | 330 | 347 | 272 | 342 | 240 | 242 | 228 |
| Conductivity @ 80° C. 50% RH | S/cm | 0.174 | 0.139 | 0.160 | 0.185 | 0.131 | 0.195 | 0.171 | 0.086 | 0.127 |
| Softening temperature range | (120-140° C.) | ○ | ○ | ○ | ○ | x | x | ○ | x | ○ |
| Hydrogen gas permeation coefficient | cm³ · cm/ (s · cm² · cmHg) | $2.3 \times 10^{-9}$ | $2.7 \times 10^{-9}$ | $2.2 \times 10^{-9}$ | $2.1 \times 10^{-9}$ | $2.0 \times 10^{-9}$ | $1.8 \times 10^{-9}$ | $3.5 \times 10^{-9}$ | $4.7 \times 10^{-9}$ | $3.9 \times 10^{-9}$ |
| Softening temperature | ° C. | 130 | 131 | 135 | 126 | 151 | 147 | 137 | 115 | 135 |

The membranes of polymers H in Ex. 3 to 6 having units u1, units u2 and units u3, satisfied conditions that the hydrogen gas permeation coefficient under the conditions of a temperature of 80° C. and a relative humidity of 10% is at most $2.9 \times 10^{-9}$ cm³·cm/(s·cm²·cmHg) and the softening temperature is from 120 to 140° C. The membranes of polymers H' in Ex. 7 and Ex. 8 having only units u1 and units u3, satisfied the condition that the hydrogen gas permeation coefficient under the conditions of a temperature of 80° C. and a relative humidity of 10% is at most $2.9 \times 10^{-9}$ cm³·cm/ (s·cm²·cmHg), but the softening temperature exceeded 140° C. The membrane of polymer H' in Ex. 9 having units based on P2SVE and units u3, and the membranes of polymers H' in Ex. 10 and Ex. 11 having units based on P2SVE, units based on PSVE and units u3, had hydrogen gas permeation coefficient which exceeded $2.9 \times 10^{-9}$ cm³·cm/(s·cm²·cmHg) under the conditions of 80° C. and a relative humidity of 10%.

REFERENCE SYMBOLS

10: Membrane electrode assembly
11: Catalyst layer
12: Gas diffusion layer
13: Anode
14: Cathode
15: Polymer electrolyte membrane

What is claimed is:

1. A sulfonic acid group-containing polymer comprising units u1 represented by the following formula u1, units u2 represented by the following formula u2, and units u3 based on tetrafluoroethylene,

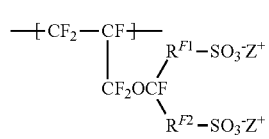

Formula u1 in the formula u1, $R^{F1}$ and $R^{F2}$ are each independently a $C_{1-3}$ perfluoroalkylene group, and $Z^+$ is a hydrogen ion, a metal ion, or an ammonium ion,

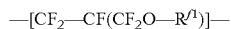     Formula u2 in the formula u2, $R^{f1}$ is a perfluoroalkyl group optionally containing at least one selected from the group consisting of a $SO_3^-Z^+$ group and an etheric oxygen atom.

2. The sulfonic acid group-containing polymer according to claim 1, of which the softening temperature is from 120 to 140° C.

3. The sulfonic acid group-containing polymer according to claim 1, of which the hydrogen gas permeation coefficient under the conditions of a temperature of 80° C. and a relative humidity of 10% is at most $2.9 \times 10^{-9}$ cm³·cm/(s·cm²·cmHg).

4. A fluorosulfonyl group-containing polymer comprising units u4 represented by the following formula u4, units u5 represented by the following formula u5, and units u6 based on tetrafluoroethylene,

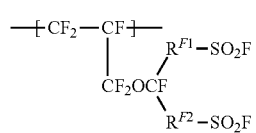

Formula u4 in the formula u4, $R^{F1}$ and $R^{F2}$ are each independently a $C_{1-3}$ perfluoroalkylene group,

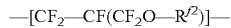     Formula u5 in the formula u5, $R^{f2}$ is a perfluoroalkyl group optionally containing at least one selected from the group consisting of an $SO_2F$ group and an etheric oxygen atom.

5. The fluorosulfonyl group-containing polymer according to claim 4, of which the TQ value is at least 220° C.

6. A method for producing a sulfonic acid group-containing polymer as defined in claim 1, which comprises hydrolyzing fluorosulfonyl groups in a fluorosulfonyl group-containing polymer comprising units u4 represented by the following formula u4, units u5 represented by the following formula u5, and units u6 based on tetrafluoroethylene,

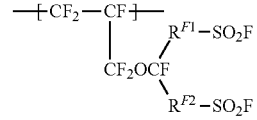

Formula u4 in the formula u4, $R^{F1}$ and $R^{F2}$ are each independently a $C_{1-3}$ perfluoroalkylene group,

     Formula u5 in the formula u5, $R^{f2}$ is a perfluoroalkyl group optionally containing at least one selected from the group consisting of an $SO_2F$ group and an etheric oxygen atom to form salt type sulfonic acid groups, and, as the case requires, further converting the salt type sulfonic acid groups to the acid type, to form acid type sulfonic acid groups.

7. The method for producing a sulfonic acid group-containing polymer according to claim 6, wherein after the hydrolysis or conversion to the acid type, the sulfonic acid group-containing polymer is permitted to be in contact with an aqueous hydrogen peroxide solution.

8. A liquid composition comprising a sulfonic acid group-containing polymer as defined in claim 1 and a liquid medium.

9. A polymer electrolyte membrane comprising a sulfonic acid group-containing polymer as defined in claim 1.

10. The polymer electrolyte membrane according to claim 9, which further contains a reinforcing material.

11. A membrane electrode assembly comprising an anode having a catalyst layer, a cathode having a catalyst layer, and the polymer electrolyte membrane as defined in claim 9 disposed between the anode and the cathode, wherein at least one selected from the group consisting of the catalyst layer in the anode, the catalyst layer in the cathode and the polymer electrolyte membrane contains a sulfonic acid group-containing polymer comprising units u1 represented by the following formula u1, units u2 represented by the following formula u2, and units u3 based on tetrafluoroethylene,

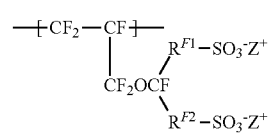

Formula u1 in the formula u1, $R^{F1}$ and $R^{F2}$ are each independently a $C_{1-3}$ perfluoroalkylene group, and $Z^+$ is a hydrogen ion, a metal ion, or an ammonium ion,

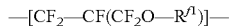     Formula u2 in the formula u2, $R^{f1}$ is a perfluoroalkyl group optionally containing at least one selected from the group consisting of a $SO_3^-Z^+$ group and an etheric oxygen atom.

12. A polymer electrolyte fuel cell provided with the membrane electrode assembly as defined in claim 11.

13. An ion exchange membrane which comprises a sulfonic acid group-containing polymer as defined in claim 1 and which is a cation exchange membrane for an chlor-alkali electrolysis, an ion exchange membrane for water electrolysis, or an ion exchange membrane for electrochemical hydrogen pump.

14. A diaphragm for redox flow secondary battery, comprising a sulfonic acid group-containing polymer as defined in claim 1.

15. An electrochemical cell comprising a sulfonic acid group-containing polymer as defined in claim 1.

* * * * *